United States Patent [19]

Leshik et al.

[11] Patent Number: 4,546,002

[45] Date of Patent: Oct. 8, 1985

[54] COLD-WATER-SOLUBLE GELATIN POWDERS

[75] Inventors: Richard R. Leshik, Ewing Township, Mercer County; Nancy A. Swallow, Plainsboro; Steven J. Leusner, Lakewood; David J. DiGiovacchino, Hightstown, all of N.J.

[73] Assignee: General Foods Corporation, White Plains, N.Y.

[21] Appl. No.: 583,461

[22] Filed: Feb. 24, 1984

[51] Int. Cl.$^4$ ................................................. A23L 1/04
[52] U.S. Cl. ..................................... 426/576; 426/443
[58] Field of Search ................................ 426/576, 443

[56] References Cited

U.S. PATENT DOCUMENTS

| | | |
|---|---|---|
| 1,735,356 | 11/1929 | Neff . |
| 2,819,970 | 1/1958 | Steigmann . |
| 2,819,971 | 1/1958 | Gunthardt . |
| 3,018,180 | 1/1962 | Lauck et al. . |
| 3,595,675 | 7/1971 | Ash et al. . |
| 3,904,771 | 9/1975 | Donnelly .................... 426/576 |
| 3,930,052 | 12/1975 | De Brou ...................... 426/576 |
| 4,224,348 | 9/1980 | Hayashi et al. ............... 426/576 |
| 4,401,685 | 8/1983 | Brown et al. ................. 426/576 |
| 4,407,836 | 10/1983 | Bosco et al. ................. 426/576 |

*Primary Examiner*—Jeanette Hunter
*Attorney, Agent, or Firm*—Thomas R. Savoie; Barbara Toop D'Avanzo; Daniel J. Donovan

[57] ABSTRACT

A gelatin-containing powdered mix (e.g. gelatin dessert mix) which is dispersible and soluble in water as cold as 45° F. (7.2° C.) is prepared using particles of amorphous gelatin between 230 and 400 U.S. mesh, food acid effective to obtain a pH of from 2.7 to 3.7, a salt such as the neutral salt sodium chloride, a sweetening agent and mono and/or diglycerides. Preferably the amorphous gelatin has a tamped bulk density of from 32 to 49 lbs/ft$^3$ (0.51 to 0.78 g/cc).

9 Claims, No Drawings

COLD-WATER-SOLUBLE GELATIN POWDERS

BACKGROUND OF THE INVENTION

1. Field of the Invention

The present invention relates to a cold-water soluble gelatin powders, such as dessert mixes, which readily disperse and dissolve in tap water having a temperature as low as 45° F.

The art has long recognized the need for cold-water soluble gelatin products as there is a growing demand for all categories of food products which can be fully prepared and ready for consumption in the shortest period of time. The vast majority of gelatin dessert mixes which are currently available require the use of hot water to dissolve the gelatin and extended times, on the order of from about 2 to about 4 hours, to permit them to achieve the proper consistency for eating. Thus, these products are often viewed as inconvenient because they require the use of hot water and also because of the extended setting time before they can be enjoyed. Because of this, many consumers who enjoy eating gelatin desserts and salads forego thier use because they perceive them as too inconvenient.

2. Background Art

Various prior art disclosures are directed to the production of cold-water soluble gelatin and cold-water soluble gelatin dessert mixes; however, none of these prior art inventions have had a significant effect in the marketplace. It has been known for some time, as exemplified by U.S. Pat. No. 2,819,970 to Steigmann, that a gelatin material which is soluble in cold water may be prepared by drying (e.g. spray drying, drum drying, or freeze drying) an aqueous gelatin solution in a manner which preserves the gelatin in a molecularly dispersed amorphous form rather than the usual crystalline form. Use of amorphous gelatin material has, however, led to problems of clumping, poor dispersibility and/or foaming when the gelatin particles are mixed with cold water via simple mixing techniques such as stirring with a spoon or fork. In addition prior amorphous gelatin-containing dessert mixes were found not to be easily dispersible and soluble in water under 60° F.

In an effort to overcome some of the problems associated with the use of amorphous gelatin per se as an ingredient in powdered gelatin dessert mixes the prior art has co-dried gelatin-sugar solutions. Examples of this approach are disclosed in U.S. Pat. Nos. 2,803,548 to Hagerty, 2,841,498 to Cahn et al, 3,362,830 to Addesso, 4,401,685 to Brown et al, 4,407,836 to Bosces et al, an 4,409,255 to Danielson et al. This approach however greatly increases the drying costs, produces a gelatin composition which is not suitable for use in sugar-free products, and does not produce a gelatin material composition which is soluble and/or dispersible in water as low as 50° F.

The functionality of amorphous gelatin per se has been sought to be improved via various additive, grinding or dry-blending techniques. These approaches being set forth in U.S. Pat. Nos. 2,819,971 to Gunthardt, 3,595,675 to Ash et al and 3,930,052 to De Brou et al. None of the techniques has however permitted the production of a powdered cold-water soluble gelatin-dessert composition which can be readily dispersed and dissolved in water as low as even 50° F. By means of the present invention this desirable goal has now been achieved.

DESCRIPTION OF THE INVENTION

According to this invention particles of amorphous gelatin are employed wherein at least 80% by weight of the particles are between 230 and 400 mesh (U.S. Standard Sieve) with essentially 100% of the particles being minus 230 mesh. The amorphous gelatin material must have a tamped bulk density of between 10 and 49 lbs/ft$^3$ (0.156 to 0.766 g/ml), preferably between about 32 and 49 lbs/ft$^3$ (0.5 to 0.766 g/ml).

Tamped bulk density refers to a procedure where 25 grams of the gelatin is placed in a 100 milliliter cylinder which is then continuously tapped for a period of two minutes. The resulting volume in milliliters (V) can then be read and used to calculate bulk density in lbs./ft.$^3$ (D) according to the formula $D = 25/V \times 62.4$.

The amorphous gelatin may be obtained by means of any of the well-known techniques (e.g. spray drying, drum drying, etc.) which dry solutions of gelatin from the liquid state to the dry state without passing through a gelled phase. Various compaction, grinding, screening and/or agglomerating operations will be required in order to obtain the desired particle fraction suitable for use in this invention. As the significant parameter is the particle size of the amorphous gelatin at the time the gelatin dissolves in the cold water, it is within the scope of this invention to loosely agglomerate fine gelatin particles into coarse-sized clusters that when added to water break up into the desired fine-sized particles. Such clusters which maintain the finely-sized gelatin particles intact are also within the scope of this invention.

It has been found that in order to achieve the desired cold water solubility of this invention it is necessary to employ amorphous gelatin which not only has a moisture content of below 10% by weight, but which gelatin material has never possessed a moisture content of about 10%, preferably never above 8%, by weight. It is speculated that at moisture contents above about 10% the tendency of amorphous gelatin to change to the more stable crystalline form is accelerated and that even short periods at elevated moistures can have pronounced negative effects. Drying techniques used for the production of amorphous gelatin will typically produce a product which will be at a moisture level of below 8%, however, there has not previously been recognition of the fact that constant low moisture should exist even during the processing of the amorphous gelatin. Naturally, moisture-proof packaging must be employed both to store the amorphous gelatin prior to formulating the powdered dessert composition and to store and distribute the powdered dessert composition itself.

It has further been found necessary, in order to produce a powdered gelatin-containing mix which is soluble and highly functional in water as cold as 50° F., to formulate the powdered mix so that the pH of the mix dissolved in water is within the range of from 2.7 to 3.7 and preferably between about 3.0 and 3.5. This low pH, which may be achieved with the use of cold-water soluble acids (e.g., citric acid and malic acid) has been found to be an aid in imparting improved clarity in the final gelled product. Where the powdered mix to be formulated to a conventional pH of about 4.0 a slightly hazy gel having a coarse mouthfeel and appearance result when 50° F. or lower temperature water is used to dissolve the gelatin.

Unfortunately the low pH, while necessary for product functionality, has a negative effect on the gelling rate of a given formulation. Unexpectedly it has been found that the addition of low levels of cold water-soluble, edible, salts is effective to increase the set rate of a low-pH, powdered gelatin dessert formulation. Neutral salts, such as sodium trimetaphosphate (STMP) and chloride salts of sodium, potassium and magnesium and non-neutral salts, such as sodium tripolyphosphate (STP), sodium tetrametaphosphate (STTMP) and tetrasodium pyrophosphate (TSPP) are particular useful. The use of netural salts in the absence of any buffer salt is an embodiment of this invention which is specifically contemplated.

These salts will be included in the mix levels of from about 2% to below about 15%, typically at about 3 to 7%, by weight of the gelatin (dry basis) component, so as to avoid any adverse flavor effect as well as avoiding precipitation of the gelatin. All salts will precipitate gelatin when added at a high enough level. For example, sodium tetrametaphosphate will precipitate gelatin when used at a level as high as 7.5% by weight of the gelatin. The exact mechanism of why these salts increase the gelation rate is not known, but it appears that the addition of electrolytes in small concentrations increases the gelatin setting mechanism due to an ion interaction with the charged gelatin molecule.

The improved gelling rate of the low pH, cold-water-soluble, gelatin-containing composition of this invention due to the addition of either a neutral salt (i.e., a salt that does not react acidic or basic) or a non-neutral salt (i.e., a salt that will cause a pH effect) is demonstrated in Tables 1 and 2, respectively.

According to the experimental procedure used to generate the data set forth in Tables 1 and 2, a cold-water soluble dessert mix was dissolved in 488 ml of 50° F. water and after one hour at 50° F. the gel strength was measured and the gel appearance was noted. Gel strength is a measurement of the firmness of the gel based upon the force in grams required to cause a standardized piston to move 4 millimeters through a gelled gelatin sample, with higher gel strength members indicating a firmer texture for the gel. Here gel strength was measured in a commercially available testing unit—namely, a Voland-Stevens LFRA Texturometer (Voland Corp. Hawthorne, N.Y.). Each sample of gelatin dessert mix contains 10 grams of gelatin having a particle size of less than 230 mesh and finely ground other ingredients including 2.5 grams citric acid. All formulations were identical except for the varying salt component and the presence of 0.912 grams of trisodium citrate as a buffer salt in the 3.8 pH sample of Table 1. The other six samples in Table 1 contained no buffer salt.

TABLE 1

| Effect of Neutral Salts | | | |
|---|---|---|---|
| Neutral Salt (% wt of gelatin) | pH | Gel Strength (gms) (after 1 hr. @ 50° F.) | Gel, Texture |
| 0 | 3.8 | 26.2 | discontinuous, slightly hazy |
| 0 | 3.2 | 13.4 | weak, clear, smooth |
| 0 | 3.21 | 14.3 | weak, clear, smooth |
| 5.0-NaCl | 3.20 | 17.2 | clear, smooth |
| 5.0-NaCl | 3.23 | 20.4 | clear, smooth |
| 10.0-NaCl | 3.20 | 23.2 | clear, smooth |
| 5.0-STMP | 3.22 | 23.5 | clear, smooth |

TABLE 2

| Effect of Non-Neutral Salts | | | |
|---|---|---|---|
| Salt (% wt of gelatin) | pH | Gel Strength (gms) (after 1 hr. @ 50° F.) | Gel Texture |
| 0 | 3.17 | 12.7 | weak, clear, smooth |
| 5.0-STTMP | 3.25 | 18.5 | clear, smooth |
| 7.5-STTMP | 3.32 | precipitate | cloudy |
| 5.0-STP | 3.35 | 21.4 | clear, smooth |
| 7.5-STP | 3.47 | 23.1 | clear, smooth |
| 5.0-TSPP | 3.41 | 20.6 | clear, smooth |
| 7.5-TSPP | 3.52 | 22.2 | clear, smooth |

To establish that elevation of pH due to the addition of non-neutral salts as in Table 2, is not a significant factor in increasing gel strength, and that the effect of the added salt on the gelation process is responsible for increased gel strength, an experiment was conducted which varied the acid level and/or salt level in an otherwise constant gelatin dessert mix formulation. The mix was prepared and evaluated for gel strength in accordance with the procedure previously recited. The results of this experiment are set forth in Table 3.

TABLE 3

| Effect of Non-Neutral Salts | | | |
|---|---|---|---|
| Salt (% wt of gelatin) | Citric Acid Level (gms) | pH | Gel Strength (gms) (after 1 hr. @ 50° F.) |
| 0 | 1.15 | 3.29 | 11.3 |
| 5.0-STP | 2.50 | 3.27 | 21.5 |
| 0 | 0.82 | 3.55 | 20.9 |
| 7.5-STP | 2.50 | 3.42 | 24.8 |

The use of cold water of 50° F. or less has in the past been found to produce excessive foaming and poor surface appearance in the gelled product. While the use of an antifoam agent to correct this problem would be an obvious solution, it has been found that dimethylpolysiloxane, a well-known, food-approved antifoaming agent does not function adequately in cold-water soluble glatin dessert powders. Apparently, the antifoaming ability of dimethylpolysiloxane is reduced in cold water. It has been found however that low levels of mono- and/or diglycerides, also known antifoam agents, are effective to prevent foaming and eliminate surface problems in the products of this invention. When used, the mono, and/or diglyceride level should be present in the dessert mix at a level of at least 100 ppm (parts per million) per part amorphous gelatin and preferably at a level of at least about 1,000 ppm. Levels of mono, and/or diglycerides in excess of about 2,000 ppm per part amorphous gelatin should be avoided as unacceptable cloudiness will be produced in the gel.

The mono and/or diglyceride materials useful in this invention may be any of the well-known ingredients available to the food industry such as Durem®114 a product of the Durkee Company and Atmos®300, a product of ICI Corp. Typically these materials would be a liquid or a waxy solid at room temperature and will be incorporated into the powdered gelatin dessert formulation by direct plating or by heating the solid to a liquid form and then plating onto one or more of the larger particle size components (e.g., granulated sugar) of the dessert mix.

Improved product performance with the use of minor amounts of mono and diglycerides is demonstrated by the results set forth in Table 4. Employing the experimental procedure used to generate the data set forth in Table 1, a cold-water soluble gelatin dessert mix, including varying levels of anti-foam agents as the only variable was dispersed and dissolved in 50° F. water with fork stirring and the resulting solution was evaluated for surface foam.

TABLE 4

Effect of Anti-foam Agents

| Anti-foam | Level (ppm gelatin basis) | Surface Foam |
|---|---|---|
| — | 0 | high level |
| dimethylpolysiloxane | 800 | moderate |
| dimethylpolysiloxane | 1600 | moderate |
| mono + diglycerides | 1500 | none |
| mono + diglycerides | 2000 | none, but hazy interior |

The powdered gelatin dessert mix of this invention will in its sugared form contain powdered or confectioners sugar which will have a particle size distribution of 91.5% by weight minimum through a 230 mesh (USS) screen. The mix may also contain granulated sugar having a particle size distribution wherein at least 75% by weight is between 40 and 100 mesh (USS) and preferably where there is a maximum 7% by weight larger than 40 mesh and a maximum of 10% by weight smaller than 100 mesh. The powdered sugar component has been found to help physically disperse the finely-ground amorphous gelatin thereby minimizing gelatin clumping. The powdered sugar should therefore be present in an amount of at least two parts by weight for each part of amorphous gelatin. Preferably, the mix will contain three parts, typically above five parts, powdered sugar for each part gelatin. Although there is no upper limit on the ratio of powdered sugar to granulated sugar, the added costs associated with the use of powdered sugar will tend to limit its use towards the minimum level needed to effect gelatin dispersion.

Non-sugared versions will usually contain an intensive sweetening agent such as saccharin and/or aspartame along with a non-carogenic filler such as mannitol and/or a non- or low-caloric filler such as polydextrose. These fillers should be sized comparable to the above-mentioned sugar component in order to obtain proper dispersion of the gelatin.

Cold-water-soluble food acids, typically citric acid and/or malic acid, flavor and colors will also be included in the product for their known effect. The addition of a small amount of a dispersing and/or wetting agent such as triacetin would also improve the functionality of the powdered mix.

The following example is representative of cold-water soluble gelatin dessert mixes within the scope of this invention.

EXAMPLE

| | % by weight |
|---|---|
| Powdered Sugar | 50.992 |
| Granulated Sugar | 34.653 |
| Amorphous Gelatin (drum dried) | 10.349 |
| Citric Acid | 1.966 |
| Malic Acid | 0.621 |
| Sodium Chloride | 0.517 |
| Mono + Diglycerides | 0.015 |
| Triacetin | 0.414 |
| Flavors + Colors | 0.473 |

-continued

| | % by weight |
|---|---|
| | 100.000 |

The powdered sugar component had a particle size distribution wherein at least 91.5% by weight of the particle pass through a 230 mesh (U.S.S.) screen. The granulated sugar component had a particle size distribution of less than 7% by weight on a 40 mesh (U.S.S.) screen and less than 10% by weight through a 100 mesh (U.S.S.) screen. The gelatin component possessed a particle size distribution wherein all of the particles were between 230 and 400 mesh (U.S.S.). The gelatin had a tamped bulk density of 37.4 lbs/ft$^3$ and a moisture content of 3.9% by weight.

All the dry ingredients, including color-plated and glyceride-plated granular sugar were mixed for five minutes. The triacetin was then added while mixing and mixing was continued an additional 20 minutes. 96.6 grams of the dessert mix dispersed in 454 ml of cold (45° F.) water with fork stirring within 120 seconds. The dispersion had a pH of 3.2 and set to a clear, smooth gelatin dessert texture with a clear surface within 60 minutes while being held in at about 40° F. in a refrigerator.

Having thus described the invention, what is claimed is:

1. A powdered gelatin-containing dessert mix which is readily dispersible and soluble in water at a temperature of 50° F. which comprises:
   (a) amorphous gelatin particles having a size of less than 230 mesh (U.S.S.) and wherein at least 80% of the particles are larger than 400 mesh (U.S.S.), said amorphous gelatin having a tamped bulk density of from 10 to 49 lbs/ft$^3$ and having been prepared and processed in a manner such that its moisture content never exceeded 10% by weight,
   (b) cold-water-soluble food acid in an amount effective to produce a pH of from 2.7 to 3.7, said amount being effective to increase the set rate of the gelatin without causing precipitation of the gelatin;
   (c) a salt in the amount of 2 to 15% by weight of gelatin;
   (d) a sweetening agent; and
   (e) mono and/or diglycerides in an amount of from 100 to 2000 ppm per part amorphous gelatin.

2. The mix of claim 1 wherein the sweetening agent is sucrose and is comprised of a combination of powdered sugar and granular sugar.

3. The mix of claim 1 wherein the salt is a chloride or a phosphate salt.

4. The mix of claim 1 wherein the tamped bulk density of the amorphous gelatin is between about 32 and 49 lbs/ft$^3$.

5. The mix of claim 1 wherein the pH of the dissolved mix is between 3.0 and 3.5.

6. The mix of claim 1 wherein the mono and/or diglycerides are at a level of at least 1000 ppm per part amorphous gelatin.

7. The mix of claim 2 wherein the powdered sugar is present in an amount of at least two part by weight of the gelatin.

8. The mix of claim 1 wherein the salt is a neutral salt and the mix is free of buffer salts.

9. The mix of claim 1 wherein the sweetening agent is an intensive sweetener and the mix includes a filler.

* * * * *